UNITED STATES PATENT OFFICE.

CLIFFORD D. HOLLEY, OF DETROIT, MICHIGAN, ASSIGNOR TO ACME WHITE LEAD AND COLOR WORKS, OF DETROIT, MICHIGAN, A CORPORATION OF MICHIGAN.

MANUFACTURE OF LEAD PIGMENTS.

1,082,953.  Specification of Letters Patent.  Patented Dec. 30, 1913.

No Drawing. Application filed March 3, 1911, Serial No. 612,029. Renewed April 4, 1913. Serial No. 758,956.

*To all whom it may concern:*

Be it known that I, CLIFFORD D. HOLLEY, a citizen of the United States, residing at Detroit, in the county of Wayne and State of Michigan, have invented certain new and useful Improvements in the Manufacture of Lead Pigments, of which the following is a specification.

This invention relates to the manufacture of lead pigments; and it comprises a process of producing lead oxid pigments wherein basic lead oxids are heated with a solution of a nitrate for the purpose of modifying the character of such oxids, the resulting mixture being then further treated, as by evaporation and furnacing, to obtain valuable pigments; all as more fully hereinafter set forth and as claimed.

In the manufacture of red lead and similar lead oxid pigments, it is the common practice first to produce a massicot which may be described as a relatively unstable and potentially reactive monoxid of lead, and then to treat the massicot under suitable conditions to gain the desired pigment. A good red lead should be amorphous, of rather low specific gravity, and should consist very largely of $Pb_3O_4$ with only a small percentage of unconverted monoxid (PbO). A crystalline, dense red lead containing much unconverted PbO is practically worthless for pigmentary purposes. The physical and chemical characteristics of red lead depend almost entirely upon those of the particular massicot from which it was made. Massicot may be made by drossing metallic lead under carefully controlled furnace conditions, as regards temperature, etc.; but a better method is to make it by furnacing certain kinds of basic oxids of lead, the temperature and other conditions being narrowly regulated as in the drossing method. The great difficulty heretofore in attempting to produce massicot from basic oxids has been that on account of the extremely variable character of such oxids, it was impossible by the methods proposed to obtain massicots of uniform quality and possessing all the physical and chemical characteristics requisite for the production of a high grade red lead therefrom. Massicot as ordinarily produced from basic oxids of lead is highly unsatisfactory, being often relatively inert and slow to take up oxygen; so that when such massicot is furnaced to obtain red lead, the percentage of conversion is far below that theoretically possible. The red lead produced from such a massicot is of course of inferior quality and pigmentary value. From what has been said it is evident that the wide variation in quality of red lead produced from basic oxids of lead is probably due almost entirely in the first instance to the widely varying characteristics of the basic oxids themselves.

Basic lead oxids may be obtained by a variety of processes, as for example, by "attrition" processes, which depend in general upon agitating and aerating masses of finely divided lead in water. The basic oxids obtained in these processes vary widely in physical and chemical properties according to the particular process employed, slight variations in procedure causing unexpectedly wide variation in the characteristics of the basic oxids produced. Moreover the quality of basic oxids produced in any one of these attrition processes is liable to considerable variation, in spite of the greatest care to standardize the process in all details. Slight differences in the size of charge treated, the size of the lead particles forming the charge, the amount and quality of the water employed, the extent of aeration, the temperature of operation, etc., all cause disproportionately great differences in the resulting basic oxids as regards their physical and chemical properties. Basic oxids thus produced range in color from greenish yellow, through yellow and orange, to brownish red; and their physical and chemical properties vary as widely as do their colors. Some are coarsely crystalline in structure, relatively stable and inactive in character, and of a low degree of basicity. Such oxids do not take up oxygen readily to form red lead; in fact their conduct in this respect is similar to that of litharge which may be termed a fixed or stable monoxid and which, as is well known, is not suitable for the manufacture of red lead owing to its non-reactive character. Other basic oxids of lead may be amorphous or even gelatinous in form, and chemically are unstable, extremely reactive, and highly basic in character. These highly basic oxids would be well suited to red lead making, but unfortunately it has not been possible commercially to produce them consistently and uniformly by any of the processes hitherto known. Between the two extreme types of basic oxids described above, viz: the stable inert oxid, and the unstable, highly basic reactive oxid, are many intermediate types partaking more or less of the characteristics of both extremes. At best, the product obtained from any of the proposed processes of making basic lead oxids is always a mixture of many of the various basic oxids above referred to. A part of the oxids in the mixture may chance to be fairly reactive and can be converted rather readily into red lead; but large proportions of the mixed oxids are relatively inert and in the furnacing operation fail altogether to take up oxygen to form red lead or do so only with the greatest difficulty. Red lead produced from mixtures such as these is almost invariably of inferior quality, and often is practically worthless as pigment.

Another objection to basic oxids of lead as heretofore produced is that they are prone to assume an undesirable physical condition when furnaced. When the mass of mixed basic oxids is subjected to furnace treatment in order to secure dehydration of the oxids and a more complete conversion of the metallic lead particles which are usually present, (due to the inefficiency of all attrition processes), such mass tends to fall into a powdered condition in the furnace, rendering it practically impossible to secure the proper penetration of heat and oxygen into the mass even when stirred. In making massicot and red lead, as stated, the furnace temperature must be regulated within very narrow limits. At too low temperatures the desired reactions occur not at all or only inefficiently, while if the temperature is slightly too high, dissociation of the product occurs and the reaction proceeds backward. If the temperature is allowed to become high enough to produce fusion, litharge and similar oxids result, and in making massicot and red lead, litharge is of course a highly undesirable product. The problem of properly distributing the furnace heat through the mass of basic oxids undergoing treatment is one of the greatest importance, and, on account of the tendency of such oxids when furnaced to form a dense powder, the problem becomes a difficult one to solve. Furthermore the massicot obtained from such powdered oxids is of such a soft adhesive, clinging nature, that when subsequently milled and separated for the purpose of reducing whatever coarse particles may be present and removing all unconverted lead particles, the grinding operation is rendered extremely difficult. Such massicot clings to the sides of the grinding mill and builds up into soft masses which frequently dislodge themselves and choke the mill, putting it temporarily out of service.

I have discovered that by suitably treating the basic oxids as they are ordinarily obtained, it is possible to modify their chemical and physical properties in such a manner that they are rendered entirely suitable for producing massicot, red lead, and other forms of lead oxids without encountering the difficulties usually met. For example, I may mix the basic oxids produced by any of the various attrition processes and which may contain varying percentages of "residual metallics" or unconverted particles of metallic lead, with a solution of a nitrate, as an alkali nitrate, and then heat the mixture. Or the nitrate solution may be first heated and then mixed with the oxids. It is best in any case finally to bring the mixture to a boil and to keep it at or near the boiling temperature for some time. It is also advantageous as a rule to add a small percentage of nitric acid, where the basic oxids contain as they ordinarily do, considerable amounts of admixed unconverted metallic lead particles. In producing basic oxids of lead by attrition processes, the oxids may form at first on the surfaces of the lead particles with comparative ease. But after these first formed oxids are rubbed off and new lead surfaces of lead are exposed, the oxidizing reaction for some reason does not proceed so actively, and finally it stops while there is still a considerable part of the lead particle left unconverted. If these so-called residual metallics are separated from the basic oxids and an attempt is made to convert them further by attrition, it is found that for some reason practically no conversion to basic oxid occurs. The nucleus of the original lead particle seems to have been altered in some way during the early stages of the attrition process in such a manner that it is no longer reactive under the conditions of that process. For the purposes of the present invention however, the presence of such residual metallics offers no difficulties. The nitric acid attacks and oxidizes these metallic particles rendering the action of the nitrate solution more efficient, the amount of nitric acid employed depending, of course, upon the percentage of metallic lead present. Even where hardly any residual metallics are present, a small amount of nitric acid is advantageous. After the boiling operation, the liquid is evaporated from the mixture without any previous separation, and this evaporation should occur at relatively low temperatures, say at about the boiling point of water, and may be carried on under reduced pressure, though this is not essential. The evaporation is continued until the mass is substantially dry. The resulting product is a mass of hydrated oxids of lead of highly basic and reactive character, with which is mixed a small amount of nitrites resulting from reduction of the nitrate employed in the process. Moreover the process has changed the physical character of the oxids, imparting to them a peculiar crispness and coherence while at the same time enhancing their chemical alterability, with the result that when the oxids are furnaced they react readily and yet remain in lumps of various sizes instead of falling into a dense powder as do the untreated oxids. This renders penetration of heat to all parts of the mass easy to obtain and insures uniformity in the product.

Massicot produced from basic oxids treated according to my new process, instead of being soft, clinging, and adherent, is crisp, mills freely, and is very easily separated from unconverted particles of metallic lead. This desirable physical condition of the massicot makes it particularly applicable to subsequent conversion into red lead, and its homogeneity and high degree of reactivity enable the conversion to be accomplished with great efficiency. Using massicot of this description it is easy to obtain a red lead analyzing 95 per cent. $Pb_3O_4$, voluminous in character and of excellent tint.

Instead of being evaporated down immediately after boiling with the nitrate solution, the wet mass of hydrated basic oxid may be carbonated by treating with carbon dioxid in the usual way and then dried to yield a good quality of white lead, which may be used as such or furnaced to produce oxid pigments such as orange mineral. Or the carbonating may follow a partial evaporation; but in any case the carbonating should precede the furnacing.

The exact chemical reactions involved in my new process are more or less obscure; in fact the chemistry of the hydrated basic lead oxids in general is quite complex and not fully understood. What appears to occur is a kind of homogenizing action whereby the heterogeneous basic oxids obtained for example from the so-called "attrition" processes, are rendered comparatively uniform in composition and of approximately the same degree of hydration and basicity. This homogenizing action is accompanied by a marked alteration in physical structure as above noted. The result is that by this process, the unsatisfactory, and more or less non-reactive variable basic oxids, which it has hitherto been attempted to use for making massicot and red lead, are so modified as to give basic oxids of uniform composition, of high basicity and reactivity, and of particularly advantageous physical structure.

In carrying out my invention practically I find it best to employ alkali nitrates, sodium nitrate being particularly suitable. Other nitrates such as those of the alkaline earths, lead nitrate, etc., can be used but they offer no special advantages. The proportion of nitrate employed may vary widely. The presence of a small amount of nitric acid is also usually advisable for the reason that basic oxids as produced commercially generally contain varying percentages of residual "metallics" or particles of unconverted lead, which are attacked and oxidized by the acid, the acid itself being reduced largely to ammonia in the reaction. The waste liquors from chrome yellow or lead chromate, which contain sodium or potassium nitrate and some nitric acid, are well suited for use in the present process. The sodium or potassium nitrate is reduced to a corresponding nitrite during the boiling process and remains in the evaporated mass, its presence being of advantage in a subsequent furnacing to produce red lead, where it acts as an oxygen carrier. The nitrite appears as such in the finished red lead and it may be leached therefrom if desired and recovered, being a valuable material used in the azo dye and color industries. Where the percentage of nitrite in the finished red lead does not exceed one-fourth of one per cent. it may generally, but not necessarily, be allowed to remain in the product, since in that quantity its presence does no harm.

In a specific embodiment of my invention, I may mix 200 gallons of water in which are dissolved 10 pounds of sodium nitrate and 20 pounds of nitric acid, with 5,000 pounds of the ordinary mixed basic lead oxids produced by any of the ordinary attrition processes, and after thorough mixing, heat the mixture to boiling. The boiling is continued for about 30 minutes and the mixture is then evaporated to approximate dryness at or near the temperature of boiling. The resulting mass of modified basic oxids is then dehydrated and converted into massicot by a furnacing process, and from the massicot thus produced red lead may be made by an appropriate oxidation.

What I claim is:—

1. The process of producing lead pigments which comprises subjecting basic lead oxids to the action of a nitrate in the presence of a relatively large amount of water, removing the excess of water, and treating the resulting mass to obtain lead pigments.

2. The process of producing lead pigments which comprises adding water and an alkali nitrate to a basic lead oxid, heating the mixture, evaporating to approximate dryness, and furnacing the residue to produce massicot.

3. The process of producing lead pigments which comprises adding water and sodium nitrate to a basic lead oxid, heating the mixture, evaporating to approximate dryness, and furnacing the residue to produce massicot.

4. The process of producing lead pigments which comprises subjecting a basic lead oxid containing residual metallics to the action of a nitrate and a minimal amount of nitric acid in the presence of a relatively large amount of water, heating the mixture, removing the excess of water, and treating the residue to obtain lead pigments.

5. The process of producing lead pigments which comprises boiling a basic lead oxid with a water solution of an alkali nitrate, removing the major portion of the water from the mixture, and treating the residue to obtain lead pigments.

6. The process of producing lead pigments which comprises boiling a basic lead oxid with a water solution of an alkali nitrate and nitric acid, removing the major portion of the water from the mixture, and treating the residue to obtain lead pigments.

7. The process of producing lead pigments which comprises boiling a basic lead oxid with a water solution of sodium nitrate, removing the major portion of the water from the mixture, and treating the residue to obtain lead pigments.

8. The process of producing lead pigments which comprises boiling a basic lead oxid with a water solution of sodium nitrate and nitric acid, removing the major portion of the water from the mixture, and treating the residue to obtain lead pigments.

9. The process of producing lead pigments which comprises heating a mixture of a basic oxid of lead with water containing sodium nitrate and nitric acid, evaporating off most of the water, and treating the residue to obtain massicot and red lead.

10. The process of producing lead oxids which comprises heating a mixture of commercial basic oxids of lead with a water solution of a nitrate.

11. The process of producing lead oxids which comprises heating a mixture of a basic lead oxid with a water solution of a nitrate and nitric acid.

12. The process of producing lead oxids which comprises mixing a basic lead oxid with an excess of a water solution of an alkali nitrate, and boiling the mixture.

13. The process of producing lead oxids which comprises mixing a basic lead oxid with an excess of a water solution of an alkali nitrate and nitric acid, and boiling the mixture.

14. The process of producing lead oxids which comprises mixing a basic lead oxid with an excess of a water solution of sodium nitrate and nitric acid and boiling the mixture.

15. The process of producing lead oxids which comprises mixing a basic lead oxid with an excess of a water solution of sodium nitrate and nitric acid, boiling the mixture and evaporating to approximate dryness.

16. The process of producing lead pigments which comprises adding to a mass of basic lead oxids containing admixed particles of metallic lead a relatively large quantity of water containing sodium nitrate and nitric acid, heating the mixture to boiling, evaporating off substantially all of the water, and furnacing the residue to produce massicot and red lead.

In testimony whereof I affix my signature in the presence of witnesses.

CLIFFORD D. HOLLEY.

Witnesses:
N. J. PEPIM,
H. WATKINS.